J. BOND.
SIGNALING DEVICE.
APPLICATION FILED APR. 24, 1918.
1,287,847.
Patented Dec. 17, 1918.
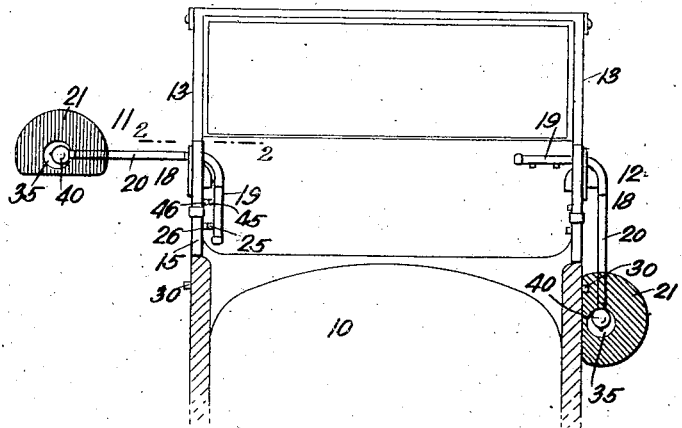
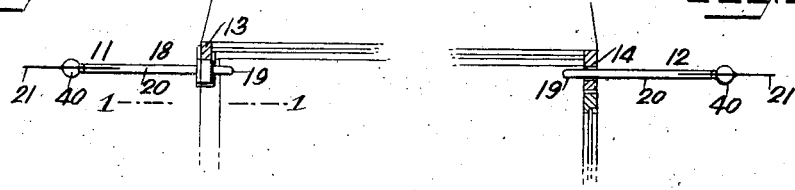
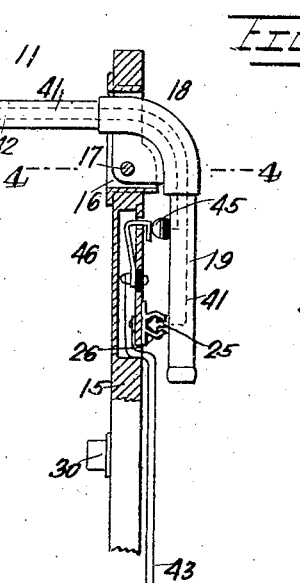
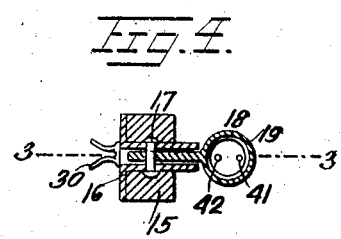
WITNESSES
H. T. Walker
INVENTOR
John Bond
BY
ATTORNEYS

UNITED STATES PATENT OFFICE.

JOHN BOND, OF BROOKLYN, NEW YORK.

SIGNALING DEVICE.

1,287,847.   Specification of Letters Patent.   Patented Dec. 17, 1918.

Application filed April 24, 1918. Serial No. 230,493.

*To all whom it may concern:*

Be it known that I, JOHN BOND, a citizen of the United States, and a resident of the city of New York, Bensonhurst, borough of Brooklyn, in the county of Kings and State of New York, have invented a new and Improved Signaling Device, of which the following is a full, clear, and exact description.

The object of the invention is to provide a new and improved signaling device more especially designed for use on automobiles, auto-trucks and other vehicles, and arranged to enable the driver of the vehicle to display to pedestrians or to following or to oncoming vehicles a signal indicating the driver's intention to turn out to the right or to the left, to slow up or to stop. Another object is to provide a signaling device to display the proper signal during the day or during the night and without diverting the attention of the driver from the roadway ahead. Another object is to enable the driver of the vehicle to conveniently actuate the signaling device. Another object is to provide a signaling device which is exceedingly simple and durable in construction, cheap to manufacture, and easily attached to open or closed vehicles as now generally constructed.

A practical embodiment of the invention is represented in the accompanying drawings forming a part of this specification, in which similar characters of reference indicate corresponding parts in all the views.

Figure 1 is a cross section of a portion of an automobile provided with the improved signaling device, the section being on the line 1—1 of Fig. 2;

Fig. 2 is a sectional plan view of the same on the line 2—2 of Fig. 1;

Fig. 3 is an enlarged sectional side elevation of the signaling device on the line 3—3 of Fig. 4;

Fig. 4 is a sectional plan view of the same on the line 4—4 of Fig. 3; and

Fig. 5 is a sectional plan view of the signaling device as applied to a closed vehicle.

The vehicle 10 is provided on the sides and in front of the driver's seat with signaling devices 11 and 12 alike in construction, so that it suffices to describe but one in detail. As shown in Figs. 1, 2 and 3, each signaling device is shown attached to the post 13 of the wind shield, while for closed cars, as shown in Fig. 5, each signaling device is attached to the door post 14.

The support 15 of each signaling device 11 and 12 is provided in its upper portion with a bearing 16 on which is pivoted at 17 a lever 18, preferably made tubula and having a short arm 19 and a long arm 20, the arms 19 and 20 extending at a right angle one relative to the other. The short arm 19 extends within the vehicle and forms a handle within convenient reach of the driver to permit the latter to actuate the signaling device, as hereinafter more fully explained. On the outer portion of the long arm 20 of the lever 18 is secured a signaling plate 21 disposed transversely and made approximately half round, as plainly indicated in the drawings. The signaling plate 21 for the left signaling device 11 is colored red while for the right-hand signaling device 12 the color is green. Normally the long arm 20 of the lever 18 hangs vertically downward, as indicated to the right in Fig. 1, while the short arm 19 extends horizontally. When the parts are in this position, the signaling device is inactive; when the driver takes hold of the short arm 19 and swings the same downward then the long arm 20 moves upward and outward into horizontal position thus displaying the signaling plate 21 to pedestrians, or oncoming or following vehicles. When the signaling device 11 is moved into display position it indicates the driver's intention is to turn out to the left, and when the signaling device 12 is moved into display position it indicates that the driver intends to turn out to the right, and when both signaling devices 11 and 12 are simultaneously moved into display position it indicates that the driver intends to slow up and eventually come to a stop.

In order to hold the signaling device in display position, the following arrangement is made: On the arm 19 of the lever 18 is secured an arrow-shaped locking and switch member 25 adapted to engage a spring retaining member 26 secured to the support 15. When the signaling device 11 or 12 is swung from its normal inactive position into display position, as shown to the right in Figs. 1 and 2 and in Fig. 3, then the member 25 engages the member 26 and thus locks the lever in display position. On the driver exerting an inward and upward pull on the short arm 19 of the lever 18 the member 25 readily disengages the member 26 to allow the lever 18 to swing back into normal inactive or non-display position.

In order to hold the lever in inactive or non-display position, use is made of a retaining device 30, preferably in the form of two spring plates and secured to the outer side of the support 15 to be engaged by the signaling plate 21 at the time the signaling device is in inactive or non-display position.

In order to render the signaling device visible during the night, the following arrangement is made: The signaling plate 21 is provided with a central opening 35 in which extends an electric lamp 40 of any approved construction and attached to the outer end of the long arm 20 of the lever 18. The electric lamp 40 is connected with two wires 41 and 42, of which the wire 41 is connected with the locking and switch member 25, the mate 26 of which is connected by a wire 43 with a battery 44 or other suitable source of electrical energy. A contact 45 is held insulated on the short arm 19 of the lever 18 and is connected with the wire 42, and the said contact 45 is adapted to engage a spring contact 46 held insulated on the support 15 and connected by a wire 47 with the battery or other source of electrical energy 44. It will be noticed that when the signaling device is swung into display position then the member 25 engages the member 26 and the contact 45 engages the contact 46 to close the circuit for the electric lamp 40 whereby the electric lamp is lighted and is visible from a distance. In practice the bulb of the electric lamp 40 for the signaling device 11 is red glass while that of the signaling device 12 is of a green color in harmony with the colors of the signaling plates 21 of the two signaling devices 11 and 12. A switch 50 is arranged in the battery circuit to disconnect the battery and lamp during the day.

From the foregoing it will be seen that the driver in charge of the vehicle can readily manipulate either or both of the signaling devices for the purpose previously stated to give the desired signal to pedestrians, oncoming and following vehicles.

The signaling device shown and described is very simple and durable in construction and is composed of comparatively few parts, not liable to get easily out of order. It will also be noticed that the support 15 can be readily clamped, screwed or otherwise fastened to the post of the wind shield in case the signaling device is used on an open car, or to the post of a door in case the device is used on a closed car.

Having thus described my invention, I claim as new and desire to secure by Letters Patent:—

1. A vehicle signaling device, comprising an angular lever having short and long arms, of which the short arm forms a handle under the control of the driver of the vehicle, a signaling plate attached to the outer portion of the said long arm, the lever being normally in inactive position with the long arm disposed vertically and the short arm disposed horizontally, the said signaling plate being provided with an opening, an electric lamp held on the end of the long arm and extending within the said plate opening, locking and switch members adapted to interlock on moving the lever into display position, one of the said members being fixed and the other being located on the short arm, a spring contact attached to a fixed part, a contact on the said short arm and adapted to engage the said fixed contact on moving the lever into display position, electrical connections arranged within the said lever and connecting the said lamp with the said switch member and the said contact on the short arm, a source of electrical energy, and electrical connections connecting the said source of electrical energy with the said fixed switch member and the said fixed contact.

2. In a vehicle signal, a support, an angular lever having arms of unequal length and pivoted to the support, a signal plate on the outer end of the long arm of the lever, an electric circuit, an electric lamp in the circuit and at the outer end of the said long arm of the lever, and pairs of contacts on the support and the short arm of the lever for closing the circuit, one pair of contacts also serving as means for locking the short arm of the lever to hold the signal in operative position.

3. In a vehicle signal, a support, a tubular angular lever pivotally mounted on the support, an apertured signal plate on the outer end of one of the arms of the lever, an electric circuit, an electric lamp in the circuit and arranged in the aperture of the signal plate, and pairs of contacts on the support and the other arm of the lever, one pair of contacts serving to lock the said lever in operative position.

JOHN BOND.